United States Patent Office 3,249,610
Patented May 3, 1966

3,249,610
SYNTHESIS OF 3-AMINO, 5-CHLORO, 6-SUBSTI-
TUTED-PYRAZINOATES
Edward Jethro Gragoe, Jr., Lansdale, and James H. Jones,
Blue Bell, Pa., assignors to Merck & Co., Inc., Rahway,
N.J., a corporation of New Jersey
No Drawing. Filed Sept. 8, 1964, Ser. No. 395,046
8 Claims. (Cl. 260—250)

This invention is concerned with a novel method for preparing 3-amino-5-chloro-6-substituted-pyrazinoic acid esters.

It was found that an alkyl 3-amino-5-chloro-6-X-pyrazinoate could be synthesized from an alkyl 3-amino-6-X-pyrazinoate 4-oxide by reaction with phosphorus oxychloride. This reaction can be chemically represented as follows:

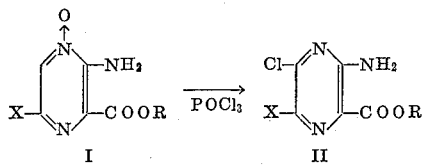

wherein

R represents lower alkyl, and

X represents
  hydrogen,
  halogen or halogen-like radicals such as chloro, bromo or trifluoromethyl,
  lower-cycloalkyl,
  mononuclear aryl, either substituted or unsubstituted, advantageously with a halogen, especially a chloro- or bromo-substituent.

The products represented by Compound II are useful intermediates in the preparation of pyrazinoylguanidines, pyrazinamidoguanidines, and pyrazinoylbenzamidines which possess diuretic and natriuretic properties useful in the treatment of edema, hypertension and other diseases known to be responsive to this therapy.

A typical example of such a useful diuretic compound is (3-amino-5-dimethylamino-6-chloropyrazinoyl)guanidine which is prepared by the reaction of methyl 3-amino-5,6-dichloropyrazinoate with dimethylamine to form the methyl 3-amino-5-dimethylamino-6-chloropyrazinoate. The latter compound is then treated with guanidine preferably under anhydrous conditions with or without a solvent to form the corresponding (3-amino-5-dimethylamino-6-chloropyrazinoyl)guanidine.

The reaction of phosphorus oxychloride with the alkyl pyrazionate 4-oxide proceeds most favorably at atmospheric pressure and at a temperature within the range of 50° C. to 105° C. Conveniently, the reaction takes place using an excess of phosphorus oxychloride as solvent and at the reflux temperature. The reaction proceeds quite rapidly and is usually complete in about ½ to 3 hours.

A solvent is not required, but inert solvents such as benzene, toluene, hexane, octane, chlorobenzene, carbon tetrachloride, dimethylformamide or the like can be utilized. The phosphorus oxychloride is ordinarily employed in excess of the amount theoretically required. About 2 moles of phosphorus oxychloride to one mole of the ester of pyrazinoic acid 4-oxide has been found particularly effective. An excess of phosphorus oxychloride can act as solvent for the reaction.

The desired product usually can be recovered by cooling the reaction mixture, whereupon the solid product separates. The crude product then can be recovered by filtration, washed, dried, and if necessary, recrystallized from an appropriate solvent.

The alkyl pyrazinoate 4-oxide compounds (I) can be prepared by the reaction of an alkyl 3-aminopyrazinoate with m-chloroperbenzoic acid advantageously in the presence of a solvent such as chloroform and with moderate heating.

The following examples illustrate methods of carrying out the present invention but it is to be understood that these examples are given for purposes of illustration and not of limitation.

EXAMPLE I

*Methyl 3-amino-5,6-dichloropyrazinoate*

STEP A.—PREPARATION OF METHYL 3-AMINO-6-
CHLOROPYRAZINOATE 4-OXIDE

A suspension of methyl 3-amino-6-chloropyrazinoate (3.8 g., 0.02 mole) and m-chloroperbenzoic acid (3.4 g., 0.02 mole) in chloroform (50 ml.) is stirred at room temperature until a solution is obtained (15 minutes). Then the mixture is refluxed for one hour. The solid that separates upon cooling is recovered by filtration; the yield is 3.0 g. (75%). After crystallization from methanol the product melts at 200–202° C.

*Analysis.*—Calculated for $C_6H_6N_3O_3Cl$: C, 35.40; H, 2.97; N, 20.64. Found: C, 35.71; H, 3.14; N, 20.82.

STEP B.—PREPARATION OF METHYL 3-AMINO-5,6-
DICHLOROPYRAZINOATE

A suspension of methyl 3-amino-6-chloropyrazinoate 4-oxide (1.5 g., 0.0074 mole) in phosphorus oxychloride (50 ml.) is heated on the steam bath until a solution is obtained (30 minutes). The reaction mixture is cooled and the product separates as a crystalline solid. The solid is recovered by filtration, washed well with benzene, and then dried. The yield is 0.7 g. (42%), M.P. 228–230° C. (A mixed melting point with a sample of methyl 3-amino-5,6-dichloropyrazinoate prepared by chlorination of methyl 3-aminopyrazinoate with sulfuryl chloride is undepressed; the M.P. is 228–230° C.)

EXAMPLE 2

*Methyl 3-amino-5-chloro-6-bromopyrazinoate*

STEP A.—PREPARATION OF METHYL 3-AMINO-6-
BROMOPYRAZINOATE 4-OXIDE

A solution of methyl 3-amino-6-bromopyrazinoate (4.6 g., 0.02 mole) and m-chloroperbenzoic acid (3.4 g., 0.02 mole) in chloroform (75 ml.) is refluxed for one hour then chilled. The solid that separates is recovered by filtration and recrystallized from ethanol to yield 5.0 g. (98%) of methyl 3-amino-6-bromopyrazinoate 4-oxide, M.P. 200–202° C.

STEP B.—PREPARATION OF METHYL 3-AMINO-5-
CHLORO-6-BROMOPYRAZINOATE

Methyl 3-amino-6-bromopyrazinoate 4-oxide (2.0 g., 0.008 mole) is dissolved in dimethylformamide (20 ml.), phosphorus oxychloride (2.0 ml.) is added and the reaction is stirred vigorously for 30 minutes and then poured into water (100 ml.). The clear solution deposits reddish crystals after standing for several hours, which are recrystallized from acetonitrile to yield 1.5 g. (71%) of methyl 3-amino-5-chloro-6-bromopyrazinoate, M.P. 225–228° C.

EXAMPLE 3

*Methyl 3-amino-5-chloro-6-cyclohexylpyrazinoate*

Following the procedure of Example 1, except that in Step A an equimolecular quantity of methyl 3-amino-6-cyclohexylpyrazinoate is substituted for the methyl-3-amino-6-chloropyrazinoate, there is produced the methyl 3-amino-6-cyclohexylpyrazinoate 4-oxide. This latter compound is converted to methyl 3-amino-5-chloro-6-cyclohexylpyrazinoate following the procedure of step B.

EXAMPLE 4

*Methyl 3-amino-5-chloro-6-phenylpyrazinoate*

Following the procedure of Example 1, except that in Step A an equimolecular quantity of methyl 3-amino-6-phenylpyrazinoate is substituted for the methyl 3-amino-6-chloropyrazinoate, there is produced the methyl 3-amino-6-phenylpyrazinoate 4-oxide. This latter compound is converted to methyl 3-amino-5-chloro-6-phenylpyrazinoate following the procedure of Step B.

EXAMPLE 5

*Methyl 3-amino-5-chloro-6-(p-chlorophenyl) pyrazinoate*

Following the procedure of Example 1, except that in Step A an equimolecular quantity of methyl 3-amino-6-(p-chlorophenyl)pyrazinoate is substituted for the methyl 3-amino-6-chloropyrazinoate, there is produced the methyl 3-amino-6-(p-chlorophenyl)pyrazinoate 4-oxide. This latter compound is converted to methyl 3-amino-5-chloro-6-(p-chlorophenyl) pyrazinoate following the procedure of Step B.

We claim:

1. A process for producing an alkyl 3-amino-5-chloro-6-X-pyrazinoate, which comprises the reaction of phosphorus oxychloride with an alkyl 3-amino-6-X-pyrazinoate 4-oxide, wherein X is selected from the group consisting of hydrogen, halogen, lowercycloalkyl and mononuclear aryl.

2. The process of claim 1 wherein the reaction temperature is within the range of about 50° C. to 105° C.

3. The process of claim 1 wherein an excess of phosphorus oxychloride is present as a solvent.

4. A process for producing an alkyl 3-amino-5,6-dichloropyrazinoate which comprises the reaction of phosphorus oxychloride with an alkyl 3-amino-6-chloropyrazinoate 4-oxide.

5. A process for producing an alkyl 3-amino-5-chloro-6-bromopyrazinoate which comprises the reaction of phosphrous oxychloride with an alkyl 3-amino-6-bromopyrazinoate 4-oxide.

6. A process for producing an alkyl 3-amino-5-chloro-6-cyclohexylpyrazinoate which comprises the reaction of phosphorus oxychloride with an alkyl 3-amino-6-cyclohexylpyrazinoate 4-oxide.

7. A process for producing an alkyl 3-amino-5-chloro-6-phenylpyrazinoate which comprises the reaction of phosphorus oxychloride with an alkyl 3-amino-6-phenylpyrazinoate 4-oxide.

8. A process for producing an alkyl 3-amino-5-chloro-6-(p-chlorophenyl)pyrazinoate which comprises the reaction of phosphorus oxychloride with an alkyl 3-amino-6-(p-chlorophenyl)pyrazinoate 4-oxide.

No references cited.

NICHOLAS S. RIZZO, *Primary Examiner.*